United States Patent
Schuller et al.

(10) Patent No.: US 6,786,232 B2
(45) Date of Patent: Sep. 7, 2004

(54) CHECK VALVE FOR A PISTON PUMP

(75) Inventors: Wolfgang Schuller, Sachsenheim (DE); Beate Schumann, Boennigheim (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 10/030,479

(22) PCT Filed: May 8, 2001

(86) PCT No.: PCT/DE01/01721
§ 371 (c)(1),
(2), (4) Date: Apr. 2, 2002

(87) PCT Pub. No.: WO01/86148
PCT Pub. Date: Nov. 15, 2001

(65) Prior Publication Data
US 2002/0112762 A1 Aug. 22, 2002

(30) Foreign Application Priority Data
May 10, 2000 (DE) .......................... 100 22 808

(51) Int. Cl.[7] ............................. F04B 53/12; F16K 15/02
(52) U.S. Cl. ............................ 137/543.17; 137/454.4; 137/540; 251/337; 303/116.4
(58) Field of Search ................ 137/454.4, 540, 137/543.17, 543.19, 539; 251/337; 267/161, 160, 162, 163; 303/11, 116.4, 901; 417/549, 552, 470

(56) References Cited

U.S. PATENT DOCUMENTS

| | | | | |
|---|---|---|---|---|
| 2,401,856 A | * | 6/1946 | Brock ........................ | 251/337 |
| 3,868,099 A | * | 2/1975 | Maucher et al. ............ | 267/161 |
| 5,232,273 A | * | 8/1993 | Eckstein et al. .......... | 303/116.4 |
| 5,511,864 A | * | 4/1996 | Reinartz et al. ............ | 303/901 |
| 5,567,135 A | * | 10/1996 | Mueller et al. ............. | 417/549 |
| 5,580,226 A | * | 12/1996 | Staib .......................... | 417/549 |
| 5,722,738 A | * | 3/1998 | Beck et al. ............... | 303/116.4 |
| 5,897,303 A | * | 4/1999 | Mueller ...................... | 417/549 |
| 6,217,300 B1 | * | 4/2001 | Schuller et al. ............. | 417/549 |
| 6,283,733 B1 | * | 9/2001 | Merklein et al. ........... | 417/549 |

FOREIGN PATENT DOCUMENTS

| | | | | |
|---|---|---|---|---|
| DE | 16 53 459 A | * | 2/1972 | |
| DE | 28 55 541 A | * | 6/1980 | |
| DE | 33 29 652 A | * | 2/1985 | |
| DE | 41 07 979 A | * | 9/1992 | |
| DE | 197 32 810 A | * | 2/1999 | |
| WO | WO 99/40323 | * | 8/1999 | |

OTHER PUBLICATIONS

International Search Report on the corresponding International Application PCT/DE 01/01721; Sep. 2001.*

* cited by examiner

Primary Examiner—Ramesh Krishnamurthy
(74) Attorney, Agent, or Firm—Ronald E. Greigg

(57) ABSTRACT

A check valve for a piston pump of a traction-controlled vehicle brake system includes hollow cylindrical valve seat part and a disk-shaped valve closing body, which is embraced by a spring clip and is secured to and guided against the valve seat part. The invention has the advantage that the check valve can be simply and inexpensively manufactured.

4 Claims, 2 Drawing Sheets

CHECK VALVE FOR A PISTON PUMP

CROSS-REFERENCE TO RELATED APPLICATIONS

This application is a 35 U.S.C. 371 application of PCT/DE 01/01721, filed on May 8, 2001.

BACKGROUND OF THE INVENTION

1. Field of the Invention

The invention relates to a check valve for a piston pump, particularly for use in a piston pump of a hydraulic vehicle brake system that has a traction control apparatus.

2. Description of the Prior Art

A check valve of this kind has been disclosed, for example, by DE 41 07 979 A1. The known check valve is disposed at one end of a piston that is part of a piston pump; the piston pump is provided for supplying brake fluid to a hydraulic vehicle brake system that has a traction control apparatus. The piston has an axial opening whose mouth constitutes a valve seat of the check valve. A ball disposed against the valve seat constitutes a valve closing body of the known check valve. In an intrinsically known fashion, the ball that constitutes the valve closing body rests in a sealed fashion against the valve seat when the check valve is closed and is lifted up from the valve seat when the check valve is open.

The expensive assembly of the known check valve during the assembly of the piston pump is disadvantageous; the known check valve cannot be preassembled as a unit. Another disadvantage of the known check valve is that a guide must be provided for the valve closing body.

SUMMARY OF THE INVENTION

In a check valve according to the invention, the valve closing spring is embodied as a spring clip which embraces the valve closing body, is attached to the valve seat part, and connects the valve closing body to the valve seat part in a mobile fashion. The check valve according to the invention has the advantage that its valve closing spring simultaneously constitutes a guide and a valve stroke limitation for the valve closing body. The latter means that the spring clip limits a distance by which the valve closing body can be lifted up from the valve seat. The valve stroke limitation permits a short closing time of the check valve to be achieved. The check valve according to the invention can be simply and inexpensively produced out of only three parts, is suitable for miniaturization, and is thus suitable for use as an inlet or outlet valve of a piston pump of a traction-controlled vehicle brake system. However, this is not the only potential application of the check valve according to the invention; it can, in principle, be used anywhere that backflow needs to be prevented. The check valve according to the invention constitutes a subassembly whose parts are held together and which can be stored and installed as a unit.

Our embodiment of the valve closing body has a disk-shaped component and has the advantage that when the check valve opens, it rapidly unblocks a large flow cross section which lends the check valve favorable dynamic properties.

The check valve according to the invention is provided as an inlet or outlet valve of a piston pump, particularly for connecting to an end of a piston of the piston pump. According to the invention, the piston pump is particularly provided as a pump in a brake system of a vehicle and is used to control the pressure in wheel brake cylinders.

Depending on the type of brake system, these brake systems are referred to by the abbreviations ABS, TCS, ESP, or EHB. In the brake system, the pump is used, for example, to return brake fluid from one or more of wheel brake cylinders to a master cylinder (ABS) and/or for supplying brake fluid from a reservoir into one or more of wheel brake cylinders (TCS, ESP, or EHB). The pump is required, for example, in a brake system with a wheel slip regulation (ABS or TCS) and/or in a brake system used as a steering aid (ESP) and/or in an electrohydraulic brake system (EHB). Wheel slip regulation (ABS or TCS) can, for example, prevent the wheels of the vehicle from locking when there is powerful pressure on the brake pedal during a braking maneuver (ABS) and/or can prevent the driven wheels of a vehicle from spinning when there is powerful pressure on the accelerator pedal. In a brake system used as a steering aid (ESP), a brake pressure is built up in one or more wheel brake cylinders, independent of an actuation of the brake pedal or accelerator pedal, in order, for example, to prevent the vehicle from swerving out from the path desired by the driver. The pump can also be used in an electrohydraulic brake system (EHB) in which the pump supplies brake fluid to the wheel brake cylinder(s) when an electric sensor detects an actuation of the brake pedal or in which the pump is used to fill a reservoir of the brake system.

BRIEF DESCRIPTION OF THE DRAWINGS

The invention will be explained in detail below in conjunction with a preferably selected exemplary embodiment shown in the drawings, in which.

DESCRIPTION OF THE PREFERRED EMBODIMENT

Figure 1:
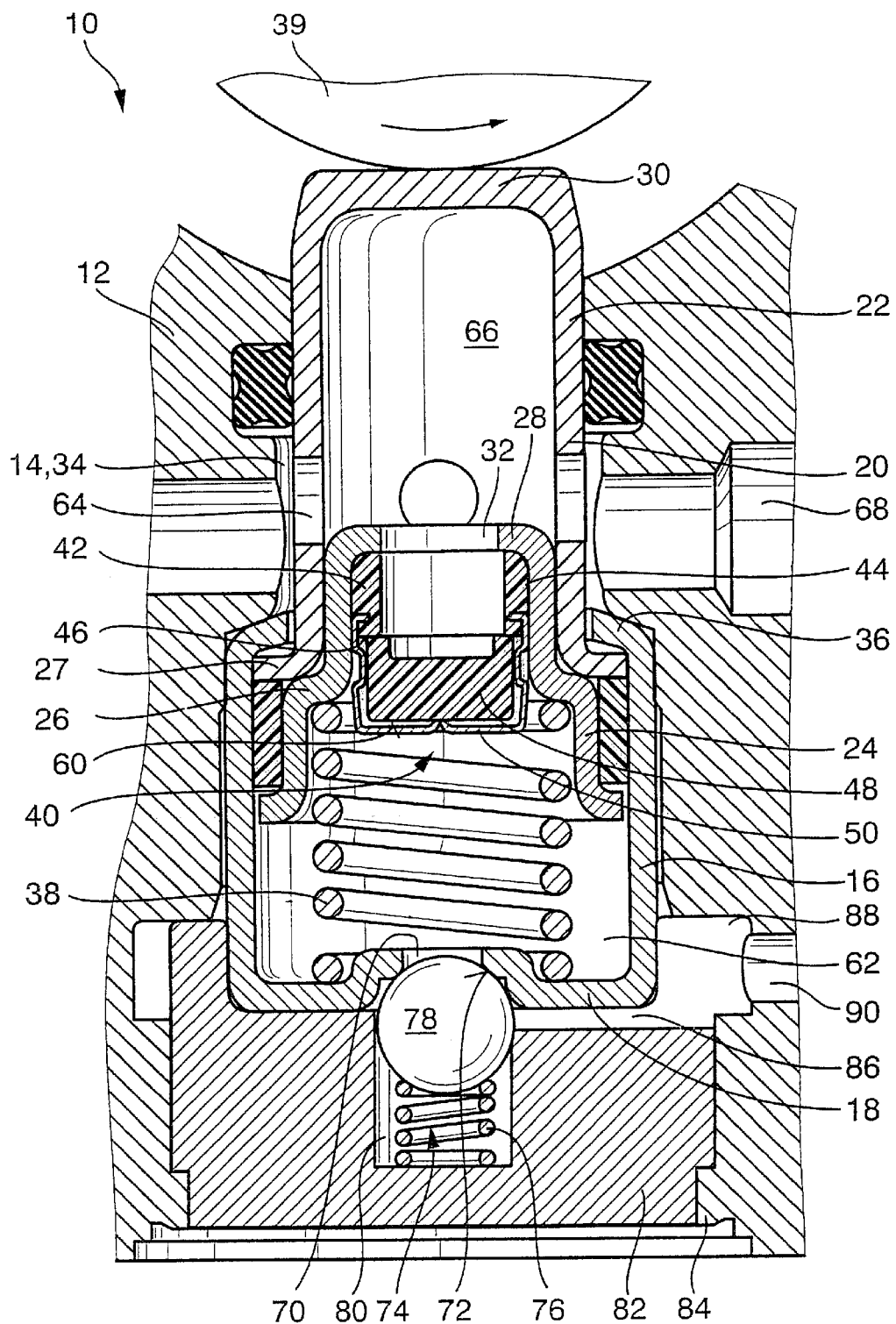
FIG. 1 shows an axial section through a piston pump with a check valve according to the invention.

The piston pump 10 shown in FIG. 1 is inserted into a hydraulic block 12, which constitutes a pump housing and will be referred to as such below. The hydraulic block 12, of which only the part surrounding the piston pump 10 is shown in the drawing, contains a hydraulic control circuit of a traction-controlled vehicle brake system that is not otherwise shown. In addition to the piston pump 10, other hydraulic components that are not shown, e.g. solenoid valves, are inserted into the hydraulic block 12 and hydraulically connected to one another.

The hydraulic block that constitutes the pump housing 12 is provided with a stepped pump bore 14 into which a cup-shaped sleeve 16 is inserted, which has a sleeve bottom 18 that is of one piece with it. The sleeve 16 is produced by being deep-drawn from a metal sheet. A piston 20 of the piston pump 10 is guided in an axially mobile fashion with one part of its length in the sleeve 16 and with another part of its length, which protrudes from the sleeve 16, in the pump bore 14. The pump bore 14 and the sleeve 16 constitute a piston guide 14,16.

The piston 20 is essentially comprised of two parts; it has a beaker-shaped outer part 22 into which a cup-shaped inner part 24 is press-fitted over approximately half of its axial length. The outer part 22 and the inner part 24 are produced as shaped parts by being deep-drawn from a metal sheet. The inner part 24 has an annular step 26 with which it presses against an annular step 27 of the outer part 22. At one end, the inner part 24 has an end wall 28 that is of one piece with it. The outer part 22 also has an end wall 30 that is of one piece with it. An open end of the inner part 24 is oriented away from the outer part 22. The end wall 28 of the inner part 24 is provided with a central opening 32 to permit the passage of brake fluid. In order to increase abrasion resistance, the outer part 22 is hardened, at least in the vicinity of its end wall 30, and no further machining is carried out; a surface quality of the inner part 24 and the outer part 22 is sufficient.

The piston pump 10 shown in FIG. 1 is embodied as a stepped piston pump. This means that the piston 20 is guided and sealed along a greater diameter inside the sleeve 16 than outside the sleeve 16 in the pump bore 14 in the pump housing 12. Because it is embodied as a stepped piston pump, the piston pump 10 has an annular chamber 34 encompassing the piston 20 in the pump bore 14 and/or in the sleeve 16. A volume of this annular chamber 34 changes during a reciprocating stroke motion of the piston 20 and produces an aspiration of brake fluid even during a delivery stroke of the piston 20 of the piston pump 10.

A free edge 36 of the sleeve 16 is crimped inward; it secures the piston 20 against the annular step 27 of its outer part 22 in the sleeve 16. A piston restoring spring 38, which is embodied as a helical compression spring, is inserted into the sleeve 16. The piston restoring spring 38 is supported against the sleeve bottom 18 and presses against the annular step 26 of the inner part 24 of the piston 20 on the inside of the piston 20. The piston restoring spring 38 presses the piston 20 against the circumference of a cam 39, which can be driven to rotate by an electric motor and is disposed at the end of the piston 20 protruding from the sleeve 16. When the cam 39 is driven to rotate, it sets the piston 20 into an axially reciprocating stroke motion.

Figure 2:
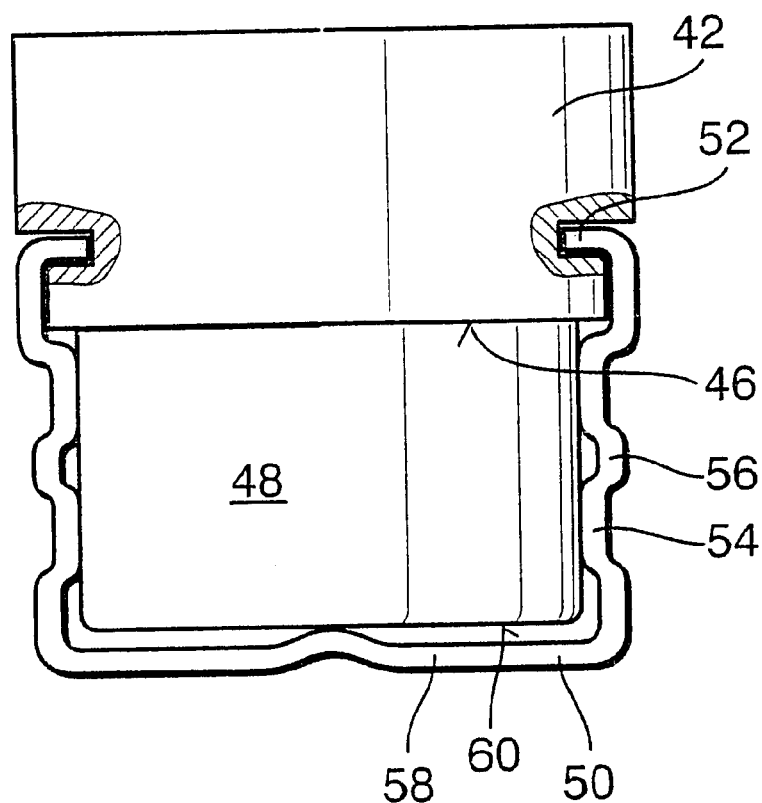
FIG. 2 shows an enlarged side view of the check valve from FIG. 1.

A check valve 40 according to the invention, an enlarged depiction of which is shown in FIG. 2, is connected to the end of the piston 20 disposed inside the sleeve 16. The check valve 40 has a hollow, cylindrical valve seat part 42 with which it is press-fitted into the beaker-shaped inner part 24 of the piston 20. This produces a force fit between the check valve 40 and the piston 20, which secures the check valve 40 in the inner part 24 of the piston 20. The valve seat part 42 of the check valve 40 according to the invention rests against the end wall 28 of the inner part 24 of the piston 20, which is provided with the central opening 32 for the passage of brake fluid. A terminating edge of the valve seat part 42 oriented away from the end wall 28 constitutes a valve seat 46 of the check valve 40. A cylindrical or circular, disk-shaped valve closing body 48 of the check valve 40 is disposed against the face of the valve seat 46 of the valve seat part 42. The valve seat part 42 and the valve closing body 48 are manufactured as injection molded plastic parts.

The valve closing body 48 is embraced by a spring clip 50, which constitutes a valve closing spring of the check valve 40. The spring clip 50 is bent from a strip of sheet metal. For attachment to the valve seat part 42, the two ends of the spring clip 50 are bent inward at right angles and constitute detent elements 52 that engage in recesses in the outer circumference of the valve seat part 42. Arms 54 of the spring clip 50 extending in an axially parallel fashion along the outer circumference of the valve closing body 48 are provided with an undulation 56 in order for the arms 54 to be able to flex in a spring-elastic fashion in their longitudinal direction. The spring bracket 50 has additional spring elasticity due to the elastic flexibility of its yoke 58, which extends across the end face 60 of the valve closing body 48 oriented away from the valve seat part 42.

The spring clip 50 secures and guides the valve closing body 48 on the valve seat part 42; it limits a valve stroke of the check valve 40, i.e. the distance by which the valve closing body 48 can be lifted up from the valve seat 46, and it presses the valve closing body 48 with a slight initial stress against the valve seat 46 so that the check valve 40 is closed in its normal state and opens in the flow direction when there is a slight pressure difference. The check valve according to the invention rapidly opens a large flow cross section, which is significant to the suction behavior of the piston pump 10 (dynamics).

The force fit 44 between the valve seat part 42 and the inner part 24 of the piston 20 assures that no brake fluid can bypass the check valve 40 when flowing from a pump chamber 62 back into the outer part of the piston 20. In addition, the force fit 44 secures the check valve 40 to the piston 20 not only during operation of the piston pump 10 but also before and during the assembly of the piston pump 10. This significantly reduces the total cost for manufacturing the piston pump 10.

The check valve 40 according to the invention constitutes an inlet valve of the piston pump 10. In order to permit the entry of brake fluid, inlet openings 64 are let into a circumference wall of the outer part 22 of the piston 20 of the piston pump 10. The inlet openings 64 permit an inner chamber 66 of the outer part 22 of the piston 20 to communicate with the annular chamber 34 encompassing the outer part in the pump bore 14. The annular chamber 34 is fed by an inlet bore 68, which is let into the pump housing 12 radial to the pump bore 14. The brake fluid travels from the inner chamber 66 of the outer part 22 of the piston 20, through the central opening 32 in the end wall 28 of the inner part 24, to the check valve 40 according to the invention, which constitutes the inlet valve of the piston pump 10.

An outlet from the pump chamber 62 of the piston pump 10 occurs by means of a central opening 70 in the sleeve bottom 18; an edge of the central opening 70 disposed on the outside of the sleeve bottom 18 constitutes a valve seat 72 of an outlet valve 74 of the piston pump 10. The outlet about 74 is embodied as a spring-loaded check valve. A helical compression spring serving as a valve closing spring 76 presses a valve ball 78, which constitutes a valve closing body, against the valve seat 72. The valve ball 78 and the valve closing spring 76 are inserted into an axial blind bore 80 in a cylindrical stopper 82, which is placed against the sleeve bottom 18. The stopper 82 is fastened and sealed in a pressure tight manner in the pump bore 14 with a circumferential caulking 84 of the pump housing 12. Brake fluid flowing out through the outlet valve 74 escapes through radial conduits 86 arranged in a star pattern between the stopper 82 and the sleeve bottom 18, into an annular conduit 88 encompassing the sleeve 16 in the pump housing 12 and from there, through an outlet bore 90 let into the pump housing 12 radial to the pump bore 14.

The foregoing relates to preferred exemplary embodiments of the invention, it being understood that other variants and embodiments thereof are possible within the spirit and scope of the invention, the latter being defined by the appended claims.

What is claimed is:

1. A check valve for a piston pump, comprising a valve seat part having a valve seat, a valve closing body that cooperates with the valve seat, and a valve closing spring which presses the valve closing body against the valve seat, said valve closing spring being embodied as a spring clip (50), which extends substantially across a diameter of the valve closing body (48), is fastened to the valve seat part (42), and connects the valve closing body (48) to the valve seat part in a mobile fashion.

2. The check valve according to claim 1, wherein the spring clip (50) has detent elements (52) which engage in recesses of the valve seat part (42).

3. The check valve according to claim 1, wherein the valve closing body (48) is embodied in the shape of a disk.

4. The check valve according to claim 3, wherein the valve seat part (52) is embodied in the shape of a tube and has a flat valve seat (46).

* * * * *